United States Patent [19]
Rosenberg

[11] 3,751,075
[45] Aug. 7, 1973

[54] COUPLING MEMBERS FOR PLASTIC PIPES AND FITTINGS USEFUL THEREWITH

[76] Inventor: Peretz Rosenberg, Moshav Beit Shearim, Israel

[22] Filed: Mar. 22, 1971

[21] Appl. No.: 126,756

[52] U.S. Cl.............. 285/61, 248/87, 285/175, 285/189, 285/332, 285/423
[51] Int. Cl. ............................................. F16l 3/00
[58] Field of Search.................. 285/189, 142, 260, 285/61, 463, 332; 248/85, 86, 87, 88

[56] References Cited
UNITED STATES PATENTS

| | | | |
|---|---|---|---|
| 3,561,726 | 2/1971 | Ionnelli............................ | 285/260 X |
| 2,889,847 | 6/1954 | Schober........................... | 285/260 X |
| 2,760,824 | 8/1956 | Leadbetter...................... | 285/192 X |
| 2,599,280 | 6/1952 | Phillips .............................. | 248/87 |
| 1,166,059 | 12/1959 | Leadbetter........................ | 285/239 |
| 3,554,580 | 1/1971 | Goyke............................... | 285/260 X |
| 3,612,409 | 10/1971 | Henning........................... | 285/260 X |
| 1,256,369 | 2/1918 | Roberts............................ | 285/332 X |

FOREIGN PATENTS OR APPLICATIONS

| | | | |
|---|---|---|---|
| 237,156 | 9/1959 | Australia.......................... | 285/240 |
| 825,564 | 10/1969 | Canada............................. | 285/260 |
| 11,472 | 1/1928 | Australia.......................... | 248/87 |

*Primary Examiner*—Dave W. Arola
*Attorney*—Benjamin J. Barish

[57] ABSTRACT

A coupling member particularly for plastic pipes is formed with a through-going bore and with an annular shoulder dividing the member into a short part and a long part separated by the shoulder, the shoulder being defined by a pair of intersecting annular walls forming a sharp peripheral edge at their juncture. The annular wall at the long part side of the shoulder is substantially at right angles to the longitudinal axis of the member, and the annular wall at the short side of the shoulder is formed with a concave taper. Various applications of such coupling member are described, including an arrangement wherein it is attached to the end of a flexible tube, an arrangement wherein it is mounted in a bore in the wall of a pipe, and a further arrangement wherein it is received in a bore of a fitting for coupling to a water sprinkler.

6 Claims, 6 Drawing Figures

PATENTED AUG 7 1973 3,751,075

INVENTOR
PERETZ ROSENBERG

BY *Benjamin J. Barish*
ATTORNEY

COUPLING MEMBERS FOR PLASTIC PIPES AND FITTINGS USEFUL THEREWITH

BACKGROUND OF THE INVENTION

The present invention relates to coupling members for pipes, particularly for plastic pipes, and to fittings useful therewith.

Plastic pipes are gaining widespread use in many types of water distribution systems, such as sprinkler irrigation systems. A number of coupling arrangements have been devised for coupling the plastic pipes together or to water sprinklers and other such devices. Most of the coupling arrangements known to me, however, are not conveniently attachable and detachable in the field, and in some cases are not detachable at all from the pipe without destroying the coupling, or cutting away part of the pipe. In addition, in many of the coupling arrangements known to me, the coupling members are designed for very special application, and therefore a large number of different types of coupling members must be provided and maintained in stock. Others of the known coupling arrangements utilize parts which are difficult and/or expensive to manufacture.

SUMMARY OF THE INVENTION

According to the present invention, there is provided a coupling member for pipes, characterized in that the coupling member is formed with a through-going bore and with an outer annular shoulder closer to one end thereof than to its other end, dividing the coupling member into a short part and a long part separated by said shoulder, the external diameter of said short part being tapered and increasing towards said shoulder, the external diameter of said long part being more gradually tapered and increasing towards said shoulder.

Such a coupling member may be used in many different applications and provides a number of advantages as will be more fully described below.

In the coupling member illustrated in the drawings and described below as a preferred embodiment of the invention, the annular shoulder is defined by a pair of intersecting annular walls forming a sharp peripheral edge at their juncture. Preferably, the annular wall at the long-part side of the shoulder is at a substantially greater angle to the longitudinal axis of the tubular member than the annular shoulder at the short-part side of the shoulder. Optimumly, for two specific applications of the coupling member described below, the annular wall at the long-part side of the shoulder is substantially at right angles to the longitudinal axis of the tubular member, and the annular wall at the short-part side of the shoulder is formed with a concave taper.

In one described application, which is a further feature of the invention, the novel coupling member is attached to the end of a flexible plastic tube, the end of the plastic tube tightly enclosing both the short-part of the tubular member and the annular shoulder, the long-part of the tubular member projecting exteriorly of the plastic tube.

In another described application, involving a further feature of the invention, the novel coupling member is mounted in a bore in the wall of a pipe, with both the short-part and the annular shoulder of the coupling member disposed within said pipe, and the long-part of the coupling member passing through the bore and projecting exteriorly of the pipe.

The latter application of the coupling member is particularly useful for tapping a main water supply pipe which tap would also include a tubular fitting having an end formed with a tapered bore for receiving the long part tapered end of the coupling member. The opposite end of such fitting would be connected to a branch line. If the tap is to be plugged, such fitting may be detached and replaced by a similar fitting but having a closed opposite end.

The coupling member of the present invention is also useful with another type fitting, providing a still further feature of the invention, which latter fitting is formed with a through-going bore one end of which is tapered inwardly for receiving the tapered end of the coupling member, the opposite end of the through-going bore leading to a housing formed with external coupling threads for coupling a sprinkler thereto, the fitting being further formed with a blind bore in side-by-side relationship with respect to the tapered end of the through-going bore, the blind bore adapted to receive a mounting element for supporting the fitting and the sprinkler.

In all such applications, the coupling is quickly attachable and detachable in the field. In addition, identical parts may be used for several different applications. Further, the parts are simple in construction and therefore inexpensive to produce.

Further features and advantages of the invention will be apparent from the description below.

BRIEF DESCRIPTION OF THE DRAWINGS

The invention is herein described by way of example only, with reference to the accompanying drawings, wherein.

DESCRIPTION OF THE PREFERRED EMBODIMENTS

Figure 1:
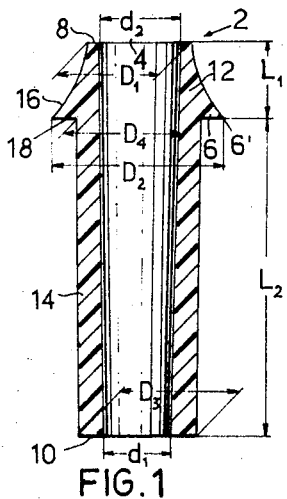
FIG. 1 is a longitudinal sectional view of a coupling member constructed in accordance with the present invention.

In FIG. 1, the coupling member 2 is of moulded plastic material. It is tubular in shape, being formed with an axial through-going tapered bore 4 and with an intermediate annular shoulder 6 closer to one end 8 than to its other end 10, dividing it into a short-part 12 and a long-part 14. Short-part 12 is tapered with its external diameter increasing toward shoulder 6. Long-part 14 is also tapered, but more gradually, with its external diameter also increasing toward shoulder 6. The latter part may be completely tapered from its outer end 10 to shoulder 6, or only the outer end of the part may be tapered, with its intermediate portion of uniform diameter; FIG. 1 illustrates the former arrangement. Bore 4 is tapered, increasing in diameter from end 10 to end 8.

Annular shoulder 6 is defined by a pair of intersecting annular walls, 16 and 18, forming a sharp peripheral edge 6' at their juncture. Annular wall 18, at the long-part side of the shoulder, is at a substantially greater angle to the longitudinal axis of the tubular member than annular wall 16 at the short-part side of the shoulder. In the construction illustrated in FIG. 1, annular wall 18 is substantially at right angles to the longitudinal axis of the tubular member, and annular wall 16 (i.e., the outer surface of short part 12) is formed with a concave taper.

Coupling members with the following dimensions (FIG. 1) have been successfully constructed and tested in the applications described below:

$d_1$=3.5 mm, $d_2$=4mm, $L_1$=5mm, $L_2$=15mm, $D_1$=4.4mm, $D_2$=6.5mm, $D_3$=5mm, and $D_4$=5.5mm.

Figure 2:
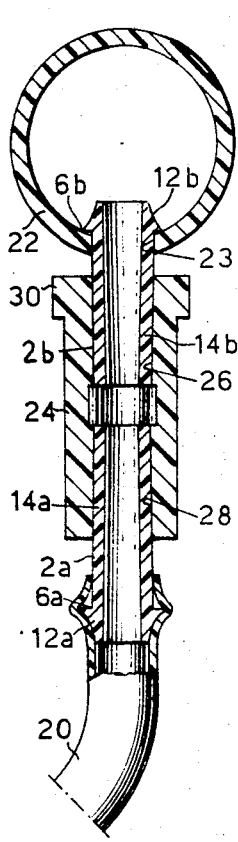
FIG. 2 is a sectional view of a coupling arrangement for tapping a main water supply pipe, which arrangement actually illustrates two applications of the coupling member of FIG. 1, one application being its attachment to a flexible plastic tube, and the other application being its mounting in a bore formed in the wall of a pipe.

FIG. 2 illustrates a coupling arrangement for tapping a main water supply pipe; this arrangement actually illustrates two applications of the coupling member of FIG. 1.

One coupling member, 2a, is attached to the end of a flexible plastic tube 20, the latter tightly enclosing both the short part 12a of the tubular member and its annular shoulder 6a. In making this attachment, it is preferred to soften the end of tube 20 by heat and then force the short-part 12a end of the coupling member into it. When the tube cools, it shrinks slightly, causing it to firmly grip the coupling member. This grip is further enhanced by the shape of annular flange 6, particularly its sharp peripheral edge 6' (FIG. 1) and the concave outer surface of part 16, which assures that sharp edge 6' will positively and firmly engage the inner surface of the tube. Long part 14a of the tubular member projects exteriorly of the plastic tube and is used for coupling the tube to another device, which in the case of FIG. 2 is a main water supply pipe 22.

The second coupling member, 2b, is inserted in a bore 23 formed in the wall of main water supply pipe 22, which is preferably of plastic. When inserted, both the short part 12b and the annular shoulder 6b of the latter coupling member are disposed within the pipe, and the long part 14b passes through bore 23 and projects exteriorly of the pipe. A tubular fitting 24 is applied over long part 14b. Tubular fitting 24 is also preferably made of moulded plastic material and is formed at one end with a tapered bore 26 for receiving the long part 14b of member 2b, and, at its opposite end, with a similar tapered bore 28 for receiving the long part 14a of coupling member 2a. It is further formed with an enlarged rim 30 at the bore 26 side thereof.

In attaching this coupling to pipe 22, fitting 24 is first force-fitted onto part 14b of member 2b, and the latter is then inserted into bore 23 until annular shoulder 6b clears it. Fitting 24, together with the water pressure in the pipe during use, firmly hold the coupling member 2b in place.

It will be seen that in the coupling arrangement illustrated in FIG. 2, main water supply pipe 22 may be coupled to plastic tube 20, serving as a branch line, in a quickly attachable and detachable member so that one in the field may quickly make or remove the connection. To disconnect branch tube 20 from main pipe 22, it is only necessary to pull-out the tube with its coupling member 2a, from fitting 24, the latter remaining on coupling member 2b.

Figure 3:
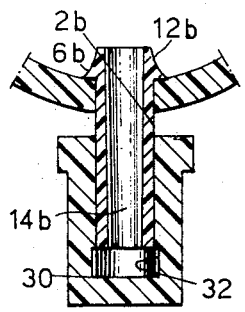
FIG. 3 is a partial sectional view illustrating the use of the coupling member of FIG. 1 for plugging the bore in the pipe wall of FIG. 2.

If it is desired to plug bore 23 formed in pipe 22, it is only necessary to remove fitting 24, leaving the coupling member 2b within the bore, and then apply a cap 30 (FIG. 3) over the tubular member. Cap 30 may be made the same as fitting 24 in FIG. 2, except that it would include only one tapered bore 32 (comparable to bore 26 in FIG. 2) which bore would be closed.

In prior known arrangements wherein a main water supply line is tapped to supply water to a branch line, leakage tends to develop at the tap because of wear and tear around the bore of the supply pipe in which the tap is applied. This is easily remedied when using the coupling member of the present invention. Here, should leakage develop between bore 23 and coupling member 2b, it is only necessary to pull-out fitting 24, push coupling member 2b into the pipe (where it will be washed down-stream by the water), and insert another coupling member 2 of slightly larger diameter as to provide a better seal between it and the bore.

Figure 4:
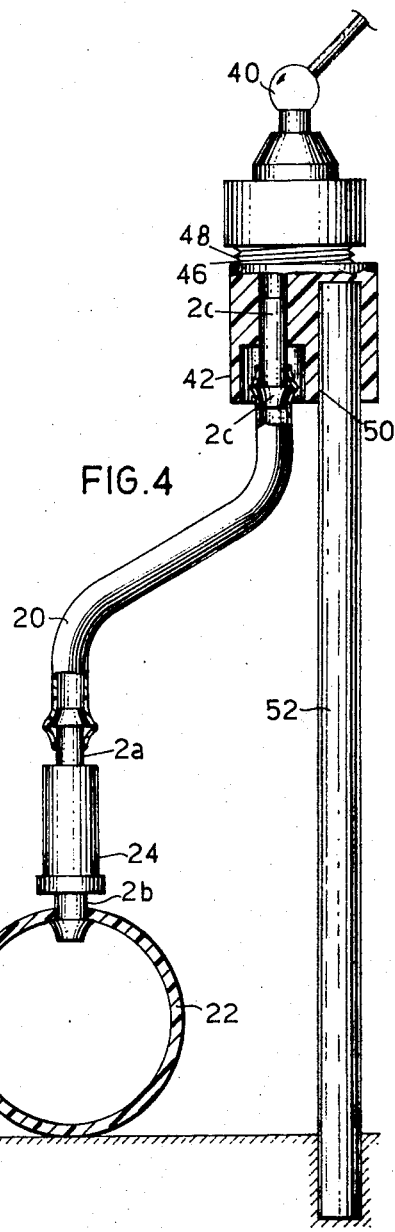
FIG. 4 is a sectional view illustrating a further coupling arrangement including the coupling member of FIG. 1.
Figure 6:
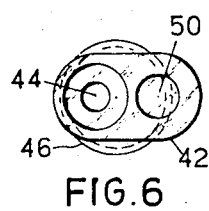
FIG. 6 is a bottom view of the fitting of FIG. 5.
Figure 5:
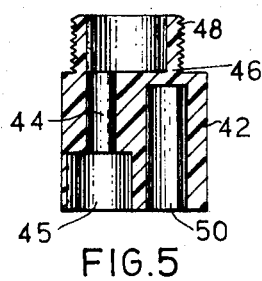
FIG. 5 is a sectional view of the fitting used in the coupling arrangement of FIG. 4.

FIG. 4 illustrates a specific application of the coupling arrangement of FIG. 2. In this application, a sprinkler 40 is supplied with water through a branch water line (plastic tube 20 of FIG. 2) from a main water supply line (pipe 22 of FIG. 2). In this application, another fitting 42 is used which is coupled to the opposite end of plastic tube 20. The latter end carries a third coupling member 2c of identical construction and mode of attachment as coupling member 2a at the other end of plastic tube.

Fitting 42 is formed with a through-going bore 44 tapered inwardly for receiving the tapered end of coupling member 2c. Bore 44 is counter-sunk, at 45, at one end, the remainder of the bore being tapered, decreasing in diameter towards a cylindrical housing 46 formed with external threads 48 for coupling the sprinkler 40 thereto. The bottom of fitting 42 is further formed with a blind bore 50 parallel to and laterally of bore 44, which blind bore receives a mounting element 52 for supporting the fitting and the sprinkler over the ground. Mounting element 52 may simply be a rod adapted to be inserted into the ground.

It will be seen that with this arrangement the sprinkler 40 may be mounted on the ground in a simple and convenient manner and at any desired location, and them may be just as simply and conveniently connected to the water supply pipe 22 by using a branch tube 20 of the appropriate length.

Many other applications and arrangements of the invention will be apparent.

I claim:

1. A coupling for pipes, comprising, a coupling member formed with an axial through-going bore and with an outer annular shoulder closer to one end of the member than to its opposite end, said shoulder dividing the member into a short part and a long part, the external diameter of said short part increasing gradually towards said shoulder, the external diameter of said long part increasing more gradually than said short part towards said shoulder, said shoulder having a sharp peripheral edge with the wall joining same to the long part side of said shoulder being substantially at right angles to the longitudinal axis of the tubular member; and a pipe having a bore in a wall thereof, said coupling member being mounted in said bore of the pipe, the walls of the bore engaging the long part of the coupling member and frictionally holding the coupling member within the bore, the short part and the annular shoulder of the coupling member both being disposed within said pipe, the long part of the coupling member passing through the bore and projecting exteriorly of the pipe.

2. A coupling as defined in claim 1, further including a tubular fitting formed with a through-going bore, the wall of said fitting bore engaging the free end of the long part of the coupling member and frictionally holding the coupling member therein.

3. A coupling as defined in claim 2, in combination with a second coupling member of identical construction as the first mentioned coupling member and attached to the end of a flexible tube, the end of the flexible tube tightly enclosing both the short part of the second coupling member and the annular shoulder thereof, the long part of the second coupling member projecting exteriorly of the flexible tube and being frictionally held within the bore of the tubular fitting.

4. A coupling as defined in claim 3, wherein the opposite end of said flexible tube has attached thereto a third coupling member identical with the first-mentioned coupling member, and a second fitting formed with a through-going bore, the walls of said latter bore engaging the long part of said third coupling member and frictionally holding same therein.

5. A coupling as defined in claim 4, wherein said second fitting comprises a cylindrical housing at one end formed with external threads for coupling a sprinkler thereto, said through-going bore leading to said cylindrical housing and being counter-sunk at the end thereof opposite to the cylindrical housing and the remainder being tapered, decreasing in diameter towards said cylindrical housing, said fitting being further formed with a blind bore extending from said opposite end of the fitting parallel to and laterally of said through-going bore, the walls of said blind bore adapted to engage a mounting rod for supporting said second fitting and the sprinkler when coupled thereto.

6. A fitting comprising a cylindrical housing at one end formed with external threads for coupling a sprinkler thereto, said fitting being formed with a through-going bore leading from the opposite end to said cylindrical housing, the bore being counter-sunk at said opposite end and the remainder being tapered, decreasing in diameter, towards said cylindrical housing, the tapered walls of said bore adapted to engage the tapered end of a coupling member for frictionally holding same therein, said fitting being further formed with a blind bore extending from said opposite end of the fitting parallel to and laterally of said through-going bore, the walls of said blind bore adapted to receive a mounting rod for supporting said fitting and the sprinkler when coupled thereto.

* * * * *